(12) United States Patent
Kobayashi

(10) Patent No.: US 6,999,110 B2
(45) Date of Patent: Feb. 14, 2006

(54) THREE-DIMENSIONAL IMAGE DISPLAY SYSTEM

(75) Inventor: Tetsuro Kobayashi, Hyogo (JP)

(73) Assignee: Japan Science and Technology Corporation, Kawaguchi (JP)

( * ) Notice: Subject to any disclaimer, the term of this patent is extended or adjusted under 35 U.S.C. 154(b) by 320 days.

(21) Appl. No.: 10/362,362

(22) PCT Filed: Aug. 29, 2001

(86) PCT No.: PCT/JP01/07409

§ 371 (c)(1),
(2), (4) Date: Feb. 27, 2003

(87) PCT Pub. No.: WO02/19012

PCT Pub. Date: Mar. 7, 2002

(65) Prior Publication Data

US 2004/0001139 A1    Jan. 1, 2004

(30) Foreign Application Priority Data

Aug. 30, 2000 (JP) .............................. 2000-261222
Aug. 30, 2000 (JP) .............................. 2000-261223

(51) Int. Cl.
*H04N 13/04* (2006.01)
(52) U.S. Cl. ..................................................... 348/51
(58) Field of Classification Search ................ 348/51, 348/52
See application file for complete search history.

(56) References Cited

U.S. PATENT DOCUMENTS 5,392,140 A * 2/1995 Ezra et al. .................... 349/15
6,061,489 A * 5/2000 Ezra et al. .................. 385/115
6,392,690 B1 * 5/2002 Fujii et al. ..................... 348/59

FOREIGN PATENT DOCUMENTS

| EP | 847208 | 10/1999 |
|----|--------|---------|
| JP | 10-239785 | 9/1998 |
| JP | 2000-47138 | 2/2000 |
| JP | 2001-56450 | 2/2001 |
| JP | 2001-235708 | 8/2001 |
| JP | 2001-264691 | 9/2001 |

OTHER PUBLICATIONS

"A Lightweight, Compact, 2D/3D Autostereoscopic LCD Backlight for Games, Monitor, and Notebook Applications"; Eichenlaub, Jesse; Jan. 1998.*

(Continued)

*Primary Examiner*—Chris Kelley
*Assistant Examiner*—Justin E. Shepard
(74) *Attorney, Agent, or Firm*—Oblon, Spivak, McClelland, Maier & Neustadt, P.C.

(57) ABSTRACT

A three-dimensional image display system utilizing both a light beam reproducing method and a shadowgraph multi-view parallax method, including a color filter is disposed on an observer side of a white-color point light source array, and, in an area apart from the color filter and white point light source, light beams emitted from the white-color point light source are selectively colored by the color filter for generating an image of each point of an object, while in the region in the vicinity of the point light source and the color filter, the light beams are selectively colored by the color filter so that image data reaching the eye from the white-color point light source through the color filter performs a view-dependent parallax stereoscopic display operation not only laterally but also vertically, and in the intermediate region, these two operations are mixed, so that a stereoscopic image is continuously formed.

10 Claims, 13 Drawing Sheets

OTHER PUBLICATIONS

"Notes On Experiments"; Physics Education; Sep. 1976.*

Yaku Tsutsumi et al.: "Rinkai-kaku bunkatsu-shiki rittai display" Eizou Media Gakkai Gijutsu Houkoku, vol. 23, No. 51, pates 7-11 Aug. 27, 1999.

Toshiyuki Sudou et al.: "Kousen saigen houshiki ni yoru 3 jigen saisei" 3D Image Conference 2000, Kouen Ronbunshuu, pp. 95-98 Jul. 6, 2000.

* cited by examiner (a)

(b)

THREE-DIMENSIONAL IMAGE DISPLAY SYSTEM

TECHNICAL FIELD

The present invention relates to a wide visual angle three-dimensional image display system utilizing both a light beam reproducing method and a shadowgraph type multi-view parallax method while preventing crosstalk images from being generated.

BACKGROUND ART

Conventional techniques for recording and reproducing stereoscopic images include holography utilizing light coherence and a method that utilizes a plurality of images but not coherence. The latter is generally classified into two schemes; i.e., a binocular parallax type stereoscope scheme in which a two-dimensional image for the right eye and a two-dimensional image for the left eye are recorded, and the recorded images are reproduced such that an observer can see the image for the right eye through his right eye and the image for the left eye through his left eye; and a multi-view parallax type scheme utilizing images viewed from multiple points of view.

In holography, which is an ideal method of recording and reproducing three-dimensional stereoscopic images (hereinafter referred to as 3D images), data regarding the wave front of light emitted from an object are used in order to record stereoscopic image data. Wave front data are recorded in such a manner that scattered light from an object and separately provided reference light are caused to interfere with each other to thereby form interference fringes, and the thus-formed interference fringes are recorded. Therefore, an optical system and a recording medium to be used must have a spatial resolution close to the wavelength of light, and a coherent light source such as a laser must be used at least for recording. Since interference fringes depend on wavelength, handling of color images; i.e., recording of color images, requires three lasers, for the three primary colors, and a complex configuration.

[A] Typical examples of the binocular parallax type stereoscope scheme, which is one of the methods that does not utilize coherence, include stereoscopic movies to be observed by the use of polarization glasses, and stereoscopic televisions utilizing a lenticular sheet. However, in such stereoscopic movies and the stereoscopic televisions, although an image can be observed stereoscopically, a stereoscopic image is not reproduced completely. Thus, the image does not change even when the observer's position to see the image is shifted, and of course, the back side of the image cannot be seen. Therefore, the binocular parallax type stereoscope scheme provides pseudo-production of stereoscopic images.

[B] Typical examples of conventional techniques utilizing the multi-view type scheme include a multi-view parallax system in which the stereoscope is multi-view typed, and integral photography, in which multiple-lens images taken by the multiple-lens are reproduced in a reverse sequence.

DISCLOSURE OF INVENTION

As described thus far, full color holography for large screen involves considerably high cost; therefore, holography is not used for real-time display of 3D images and stereoscopic movies, although holography is presently used for mediums for recording digital data, as well as for credit cards and ornaments, in which holography can be implemented in a small scale.

On the other hand, the multi-view type system that does not use coherence is classified into the multi-view parallax system, in which the stereoscope is multi-view typed, and integral photography, in which multiple images taken from multiple view points are reproduced in a reverse sequence, as described in [B].

While the binocular parallax type stereoscope described in [A] is designed to enable a user to observe images of two angles of view through respective eyes and to attain solidity from binocular parallax, the multi-view type system reproduces a number of images simultaneously that are observed differently depending on the observer's viewing position. Thus, the produced image is observed in the different way upon movement of the eyes and the glasses are unnecessary. Moreover, the multi-view type system also has many other advantages, which cannot be attained by the use of a holograph; e.g., recording and reproduction can be effected by the use of ordinary light, and a background of infinite distance can be reproduced. However, in the multi-view type parallax system and the integral photography, since image of all angles of view are formed or imaged at a certain position simultaneously (even though only portions of the images can be observed from a specific direction of course), when a user (an observer) focuses his/her eyes on that position, the user observes the images as being located at different positions. Therefore, the focus position does not coincide with a position of a viewed image, inevitably leading to the problem of unnaturalness (e.g., even when an image can be seen to be located directly in front of a user, the user's eyes are focused on a more remote position). In integral photography, images viewed from many different angles of view can be recorded with ease by the use of a micro lens array; however, when the thus-recorded images are reproduced in a reverse sequence, a user sees, from the back side, an image to be viewed from the front side (for example, when an image of a face is reproduced, the face can be seen, but the nose can be seen as being depressed). Therefore, integral photography has many drawbacks, including great labor such as cumbersome operation of reversing the image.

As described above, no 3D image recording/reproducing device (system) which is sufficiently practical exists at present, and therefore, proposal of a practical 3D image recording/reproducing device or system has been pursued. Recording and reproduction of 3D images, in particular, motion pictures, which are the most important image data medium, are useful in many fields related to information, broadcasting, movies, and entertainment, and will become a large industry in future. Therefore, research on the recording and reproduction of 3D images has been carried out in many companies, universities, private research institutes, and public research institutes, both in Japan and overseas. However, no satisfactory device has yet been developed.

Therefore, the present inventor has proposed a "light beam reproducing method" in which a group of images is projected on a color filter by the use of an array of white-color point light sources in order to artificially generate a group of light beams corresponding to light scattered from an object, to thereby generate a 3D image (Japanese Patent Application Publication No. 10-239785) as described above. The proposed method and device resemble integral photography in the point that multiple images are used. However, the proposed method and device differ from IP in that the proposed method and device reproduce 3D images having depth and do not utilize parallax, or are rather similar to holography (when image is photographed by the use of a camera, the image is blurred except for the focused portion). The proposed method and device have succeeded in generating mostly satisfactory 3D images of simple objects. However, this device has the biggest problem in that images cannot be reproduced in the vicinity of the point light source array or the color filter portion (hereinafter referred to as display unit). In order to solve the problem, the present inventor has gave up reproduction of stereoscopic image as for image data in the vicinity of display unit and proposed a "Stereoscopic image reproducing device with background" in which a background (or foreground) image without parallax and 3D image elements for reproducing light beams are drawn simultaneously on the surface of the color filter. (Japanese Patent Application No. 2000-43742). However, the background that does not change even when the visual angle is changed is suitable for standing-out signboards, but its usage is limited after all. Therefore, development of a display system which is designed to provide stereoscopic images having a depth ranging from the rear of the display unit through the portion near the display unit to the front thereof has been desired.

In addition, a "three-dimensional display system utilizing both a light beam reproducing method and a shadowgraph type multi-view parallax method" in which stereoscopic images are displayed by utilizing parallax, not by reproducing a light beam, in the vicinity of the display unit has been proposed. Although the above-described three types of three-dimensional image display systems based on reproduction of a light beam are easy to use and superior in depth of region in which stereoscopic images can be reproduced, or in extensiveness of the region in which observation can be made to the conventional multi-view type parallax system or integral photography, there is a problem in that light beams from the adjacent white-color point light sources may be intervened into a section of the color filter in addition to a light beam from the corresponding white-color point light source, which may form a crosstalk image. Provision of partitions for the respective sections of the color filter corresponding to the respective white-color point light sources may prevent generation of crosstalk images. However, it is significantly bothersome and costs much, and it does not help to broaden the region in which three-dimensional images can be observed.

Development of an easy and economical method of observing three-dimensional images over a wide visual angle without forming a crosstalk image has been expected.

Referring to schematic drawings showing a principle of stereoscopic vision, the related art will be described below.

In FIG. 1, two points P and Q represent objects to be observed, and differ from each other in direction and distance. An observer 201 can detect the directions of the objects from the direction of light beams traveling toward the observer 201 and their distances from the parallax angles of the respective eyes through which the observer 201 views the point objects. Although FIG. 1 shows a finite number of light beams, in actuality, an infinite number of light beams are present. If such light beams can be generated, the observer 201 can view the two points stereoscopically, even when the two points P and Q are not actually present. In the above-described light beam reproducing method, such light beams are generated artificially in order to enable observation of a stereoscopic image.

FIG. 2 shows a basic configuration in the light beam reproducing method. In FIG. 2, since reproduction of an infinite number of light beams is impossible, only light beams which pass through the white-color point light source array 202 distributed two-dimensionally are reproduced. Provision of a white-color point light source array 202 and a point type color filter 203 (which may be a liquid crystal panel) having a single transmissible point for each point light source so as to face to the white-color point light source array 202 enables reproduction of a colored light beams, each traveling along a straight line connecting a point light source and a corresponding transmission point. When these light beams are directed so as to pass through a single point P', the light beams are observed by the observer 204 as if they were emitted from the point P', so that the point P' can be seen three-dimensionally. As shown in FIG. 2, the observed images may also be formed in the front (on the side of the observer 204, the point P' in the figure) and in the rear (the side opposite from the observer 204, the point Q' in the figure) of the display unit (the white-color point light source array 202 and the color filter 203).

A three-dimensional object is a set of points. Therefore, when proper transmission images obtained from multiple viewpoints rather than dots are recorded on the color filter 203, the above-described configuration enables reproduction of a three-dimensional object.

The biggest problem of this system is that images cannot be reproduced around the white-color point light source array 202 and the color filter 203. However, since a number of light beams passes through points located in the region remote from the light beams reproduction color filter or the white-color point light source (hereinafter referred to as display unit); the points P', Q' in FIG. 2 and the point P in FIG. 3 (described later); the observer recognizes as if the object (point object in this case) is present in actuality, and when photographing by a camera, focusing on these points is required.

FIG. 3 shows a problem in the light beam reproducing method. Reference numeral 210 designates a display unit; 211 designates a white-color point light source array; 212 designates each point light source; 213 designates a color filter; 214 designates each section of the color filter corresponding to each point light source 212; and 215 designates an observer.

As shown in the figure, there are only one or two light beams in total emitted from the point light source 212 for reproducing the point R or the point S in the vicinity of the display unit 210. Therefore, these light beams rarely reach the observer 215, and thus three-dimensional images cannot be reproduced in the vicinity of the display unit 210 with the light beam reproducing method.

Therefore, in order to attain stereoscopic view also in the vicinity of the display unit, the above-described "three-dimensional image display system utilizing both a light beam reproducing method and a shadowgraph type multi-view parallax method" in which three-dimensional stereoscopic images are observed continuously from the rear to front of the display unit, which relates to the present invention, was proposed.

Referring now to the related art, the problem of the case where the stereoscopic images are displayed by utilizing parallax, not by utilizing a light beam reproduction, in the vicinity of the display unit; in other words, the problem to be solved by the present invention will be described in detail.

FIG. 4 is an explanatory drawing showing generation of crosstalk image. In this figure, reference numeral 310 designates a display unit; 311 designates a white-color point light source array; 312 designates a white-color point light source; 313 designates a color filter; 314 designates a section of the color filter 313; 315 designates an observer; and 316 designates a three-dimensional image observable region in which no crosstalk image is seen. In this example, it is assumed that a right point image Q is reproduced by the light beam reproducing method. There is a case in which a light beam from a certain white-color light source 312 does not pass through a section 314 of the color filter 313 corresponding to the white-color point light source 312, but through the transmission point of the section 314 that corresponds to another point light source adjacent thereto to generate a light beam. FIG. 4 shows a state in which crosstalk images Q' and Q" are generated due to the reason described above. As a consequence, when the observer 315 moves slightly from the front toward the side, the observer 315 is obliged to see the crosstalk image. It is obvious from the figure that a region in which only a right three-dimensional image can be observed without viewing light beams that invade into an adjacent section 314 of the color filter 313 is significantly limited. There is also a case in which the right image and the crosstalk image can be observed simultaneously if the distance between the color filter 313 and the white-color point light source array 311 is significantly long.

FIG. 5 shows an example in which shielding partitions are employed so that a light beam proceeds only to a section of the color filter corresponding to each white-color point light source emitting the light beam. In this figure, reference numeral 320 designates a display unit; 321 designates a white-color point light source array; 322 designates a white-color point light source; 323 designates a color filter; 324 designates each section of the color filter; 325 designates a partition; 326 designates an observer; 327 designates a region in which three-dimensional images can be observed; and reference sign P designates a right point image.

According to FIG. 5, the observable ration is not broadened, but no crosstalk image is generated. It is also possible to employ a white-color point light source having directivity. However, since these solutions involve a large number of white-color point light source, they are bothersome and causes problem in economical efficiency.

The method in which the white-color point light source and the color filter are moved closer is easy, but there are many disadvantages in this method including problems in directivity of the color filter or in industrial art.

In order to solve such problem that three-dimensional images cannot be reproduced in the vicinity of the display unit, the present invention is intended to provide a three-dimensional display system utilizing both a light beam reproducing method and a shadowgraph type multi-view parallax method, including a color filter designed to perform the conventional light beam reproducing type three-dimensional image display in the region remote from the display unit, but not to perform the three-dimensional image reproduction in the vicinity of the display unit where less reproduction light beams exist, and to display image data in this region as stereoscopic images utilizing multi-view type parallax, so that reproduction of natural three-dimensional image is realized in rear and front of the display unit, stereoscopic vision utilizing parallax by viewing from the multiple points of view in lateral and vertical directions is realized in the vicinity of the display unit, and both of them are mixed in the intermediate region, whereby a three-dimensional stereoscopic image is allowed to be continuously joined to each other over the whole region from the rear to front of the display unit.

In addition, in order to solve such problem that crosstalk images are generated when utilizing both a light beam reproducing method and a shadowgraph type multi-view parallax method, the invention is also intended to provide a wide visual angle three-dimensional image display system in which three-dimensional images may be observable in a wide visual angle while completely restricting generation of crosstalk images.

In order to achieve the objects, the invention provides;

[1] A three-dimensional image display system utilizing both a light beam reproducing method and a shadowgraph type multi-view parallax method, including a color filter disposed on the observer side of a white-color point light source array, characterized in that light beams from the white-color point light source are selectively colored by the color filter so that a group of a number of light beams corresponding to a scattered light from each point of an object is generated so that the observer recognizes as if the object is present in actuality in the region remote from the color filter and the white-color point light source, in that light beams are selectively colored by the color filter for the portion in the vicinity of the white-color point light source and the color filter where a sufficient number of light beams cannot be reproduced so that image data reaching the eye from the white-color point light source through the color filter performs a view-dependent parallax type stereoscopic display operation not only in laterally but also vertically, and in that these two operations are mixed in the intermediate region so that a stereoscopic image is continuously joined to each other.

[2] A three-dimensional image display system utilizing both a light beam reproducing method and a shadowgraph type multi-view parallax method according to the description in [1], characterized in that one or more lenses are disposed between the color filter and the observer to provide flexibility in visual appearance and/or filter design.

[3] A three-dimensional image display system utilizing both a light beam reproducing method and a shadowgraph type multi-view parallax method according to the description in [1] or [2], characterized in that a lens is inserted between the white-color point light source array and the color filter to provide flexibility in visual appearance and/or filter design.

[4] A three-dimensional image display system utilizing both a light beam reproducing method and a shadowgraph type multi-view parallax method according to the description in [1], [2] or [3], characterized in that the white-color point light source array is substituted by a combination of a white-color light source, a scatter plate and a pinhole array.

[5] A three-dimensional image display system utilizing both a light beam reproducing method and a shadowgraph type multi-view parallax method according to the description in [1], [2], [3], or [4], characterized in that the color filter is a space modulating panel capable of dynamic control to animate the reproduced three-dimensional images.

[6] A three-dimensional image display system, including a transparent medium with a refractive index of more than one inserted entirely or partially between the white-color point light source array and the color filter to broaden the three-dimensional image observable region by utilizing such nature that a light beam spreads out more outside such transparent medium due to refraction thereof, characterized in that light beams incoming at laying angles from the adjacent white-color point light source into the section of the color filter, which serves to selectively color light beams from the white-color point light source for displaying three-dimensional images, and causing harmful crosstalk images are totally reflected to prevent it from outgoing, so that three-dimensional images may be observed from a wide visual angle while preventing crosstalk image from being generated.

[7] A three-dimensional image display system according to the description in [6], characterized in that a lens or lenses are inserted between the color filter and the observer, and/or between the white-color point light source array and the color filter to provide flexibility in visual appearance and/or filter design.

[8] A three-dimensional image display system according to the description in [6] or [7], characterized in that the white-color point light source array is substituted by a combination of a white-color light source, a scatter plate, and a pinhole array.

[9] A three-dimensional image display system according to the description in [6], [7] or [8], characterized in that the color filter is a space modulating panel capable of dynamic control of a liquid crystal panel and the like to animate the reproduced three-dimensional images.

[10] A three-dimensional image display system including a transparent medium with a refractive index of more than one disposed between a image panel or a color filter and a parallax barrier, a slit, a pinhole array or a micro lens array so that invasion of adjacent images is prevented by utilizing total reflection, generation of crosstalk images is prevented, and thus a wide visual angle is achieved.

BEST MODE FOR CARRYING OUT THE INVENTION

Embodiments of the invention will be described in detail below.

A first embodiment of the invention will now be described.

A parallax system in which glasses are not used and a barrier is used will be described since it is necessary for understanding the invention.

Figure 1:
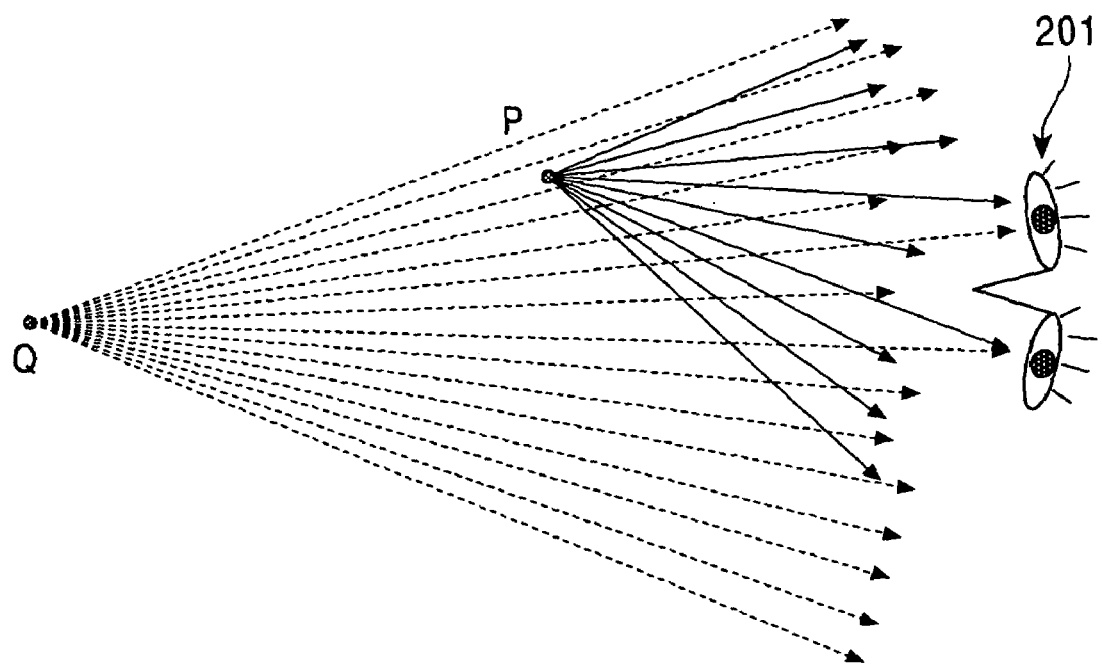
FIG. 1 is a schematic diagram showing a principle of stereoscopic vision.
Figure 2:
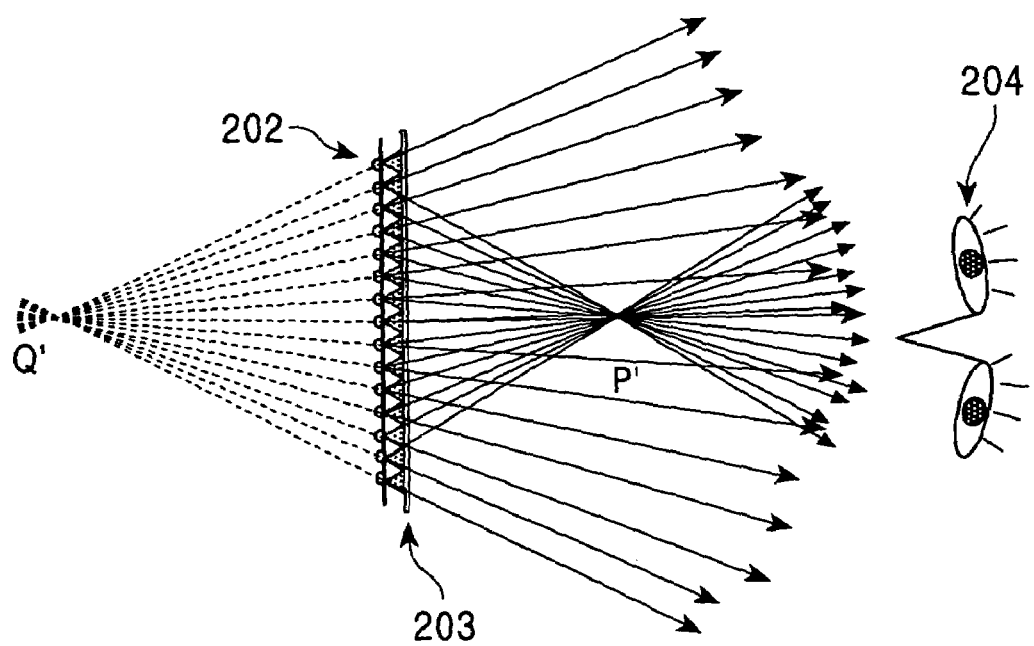
FIG. 2 is a drawing showing a basic structure of a device used in a light beam reproducing method.
Figure 3:
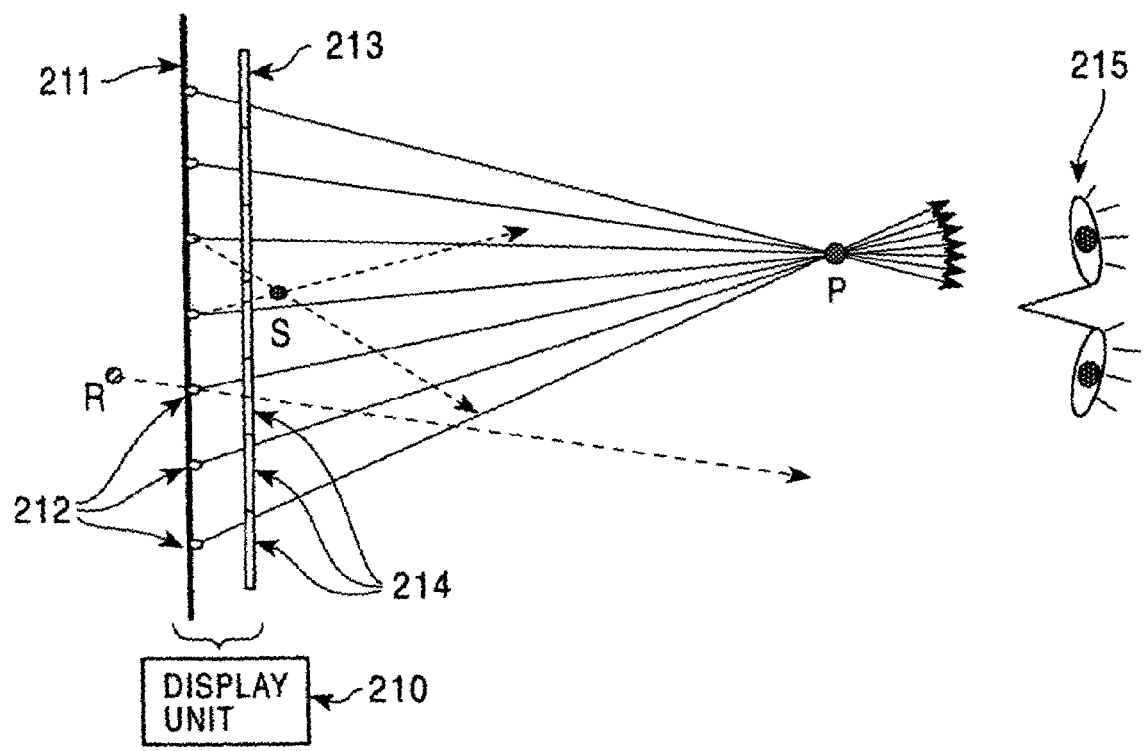
FIG. 3 is a drawing showing problems in the light beam reproducing method.
Figure 4:
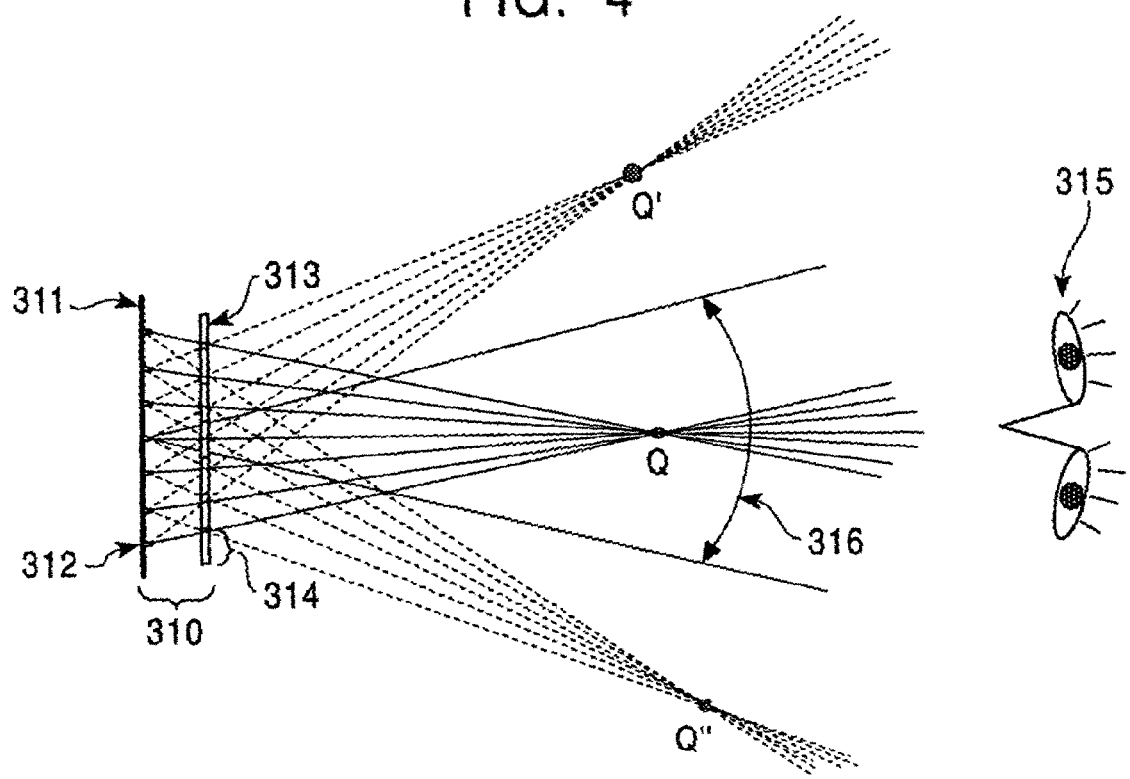
FIG. 4 is a drawing showing generation of crosstalk images in the light beam reproducing method and the three-dimensional image observable region.
Figure 5:
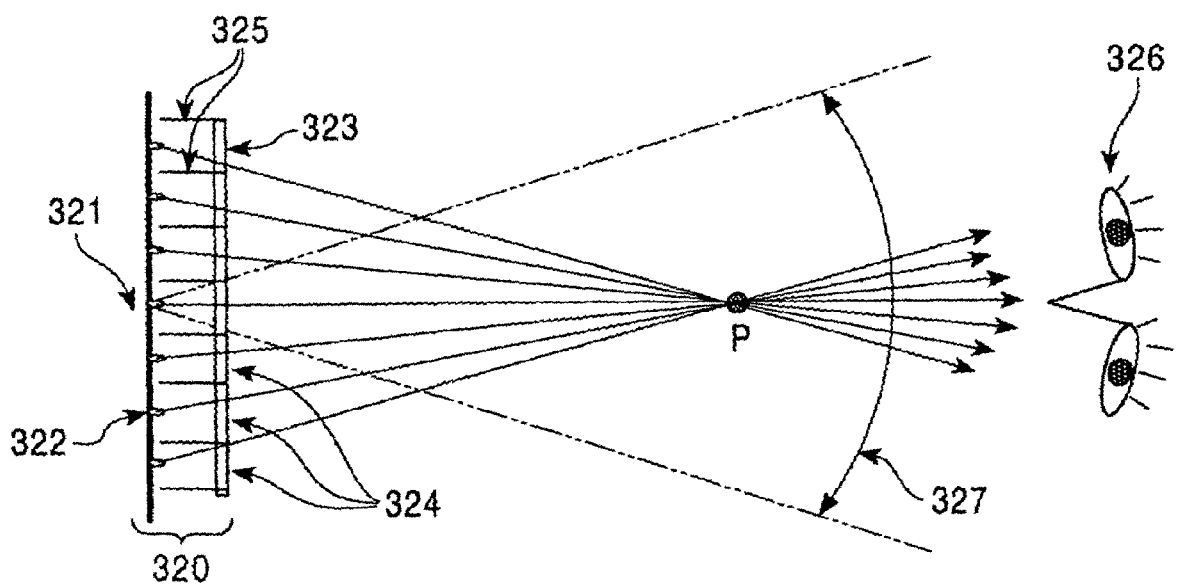
FIG. 5 is an explanatory drawing showing three-dimensional image display in the light beam reproducing method in which generation of crosstalk images is prevented by using partitions.
Figure 6:
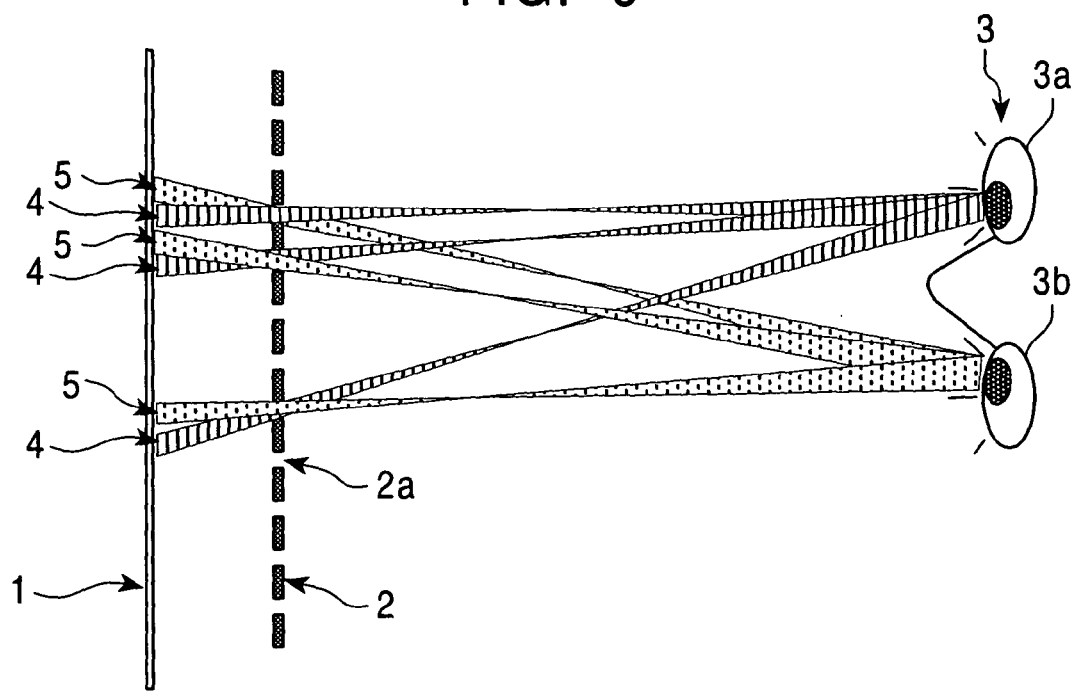
FIG. 6 is a drawing showing a basic principle of binocular parallax type parallax stereogram.

FIG. 6 shows a basic principle of a binocular parallax type parallax stereogram, which is the simplest in the systems utilizing parallax.

In this figure, reference numeral 1 designates a screen or a panel on which images are drawn; 2 designates a barrier having slits 2a; 3 designates an observer (3a designates a right eye, 3b designates a left eye); 4 designates an image for the right eye; and 5 designates an image for the left eye.

Figure 7:
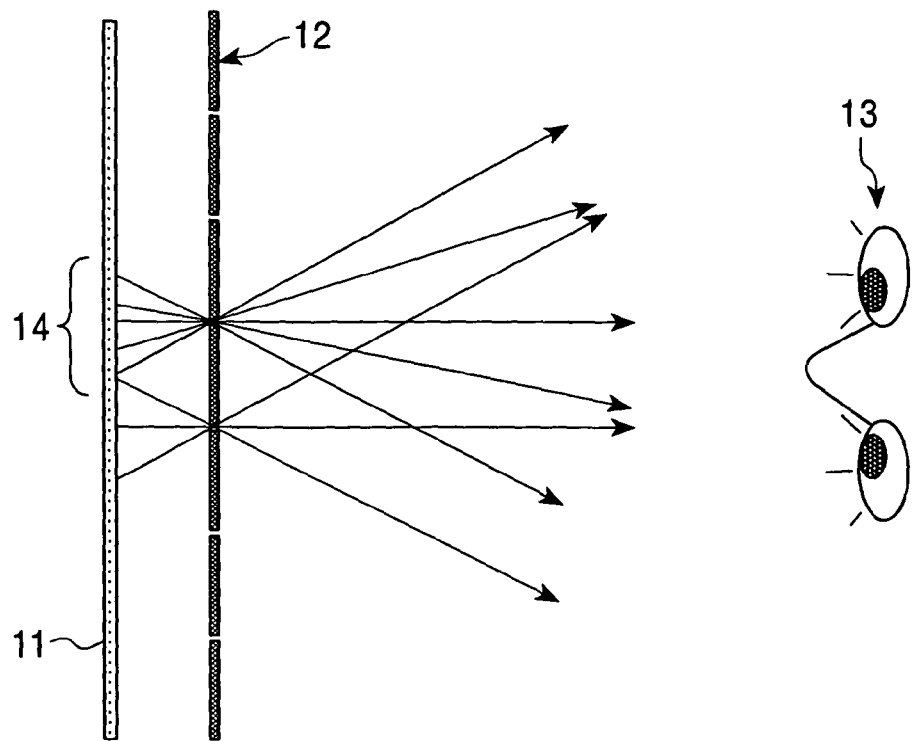
FIG. 7 is a block diagram showing multi-view type parallax.

On the screen or the panel 1, vertically sliced images taking parallax for the left eye and for the right eye into account are drawn alternately, and a barrier 2 having slits 2a formed in such a manner that the right eye 3a can only see the image 4 for the right eye and the image 5 for the left eye is blocked, and vice versa, is disposed on the observer side thereof. This device has many advantages such that it is simple in structure and that glasses are not necessary although the position to view is limited and it does not look solid in the vertical direction. There are many possible alternatives including a prism or a special screen is used in place of the barrier 2. An example that is modified so that the visual appearance changes by moving the face of the observer is shown in FIG. 7. This is a multi-view type parallax system.

In FIG. 7, reference numeral 11 designates a panel or a screen on which images are drawn; 12 designates a slit array or a two-dimensional pinhole array; and 13 designates an observer.

The images drawn on the panel or the screen 11 are not for the right eye and the left eye, but images viewed from various visual angles. In the device using the slit array 12, sliced images viewed from the lateral visual angles are drawn, and thus appearance of solidity in the vertical direction is not achieved. This is a horizontal multiple visual angle plate of the parallax stereogram shown in FIG. 6. On the other hand, when a two-dimensional pinhole array is employed in place of the slit array, appearance of solidity in the vertical and lateral directions is achieved. In this case, an image is constructed by a group of dots 14 that can be viewed through the pinhole array 12, and the images coming into the left eye and to the right eye produce a stereoscopic image that changes by the viewing position. However, since depth information is provided by parallax, artificiality remains in the focal position of the eyes.

Being equivalent to visibility of the drawing behind the slit (horizontal-only-parallax system) or pinholes (horizontal and vertical parallax system), in order to be able to separate a number of light beams passing through the slits or the pinholes in the different directions, slits and pinholes cannot be narrowed nor reduced in size so much.

Though it is not shown in the figure, a device including a micro lens array in place of the pinhole array is nothing less than an integral photography. Since its simplified version has a pinhole array in place of the micro lens array, it is exactly the same as a pinhole-type multi-view parallax system.

The positional relation between the drawn images is such that the images reproduced on the near side are laterally and vertically inverted, which is a characteristic of the conventional multi-view type parallax system and of the integral photography (they are inverted neither vertically nor laterally in the parallax system according to the invention that will be described later).

Figure 8:
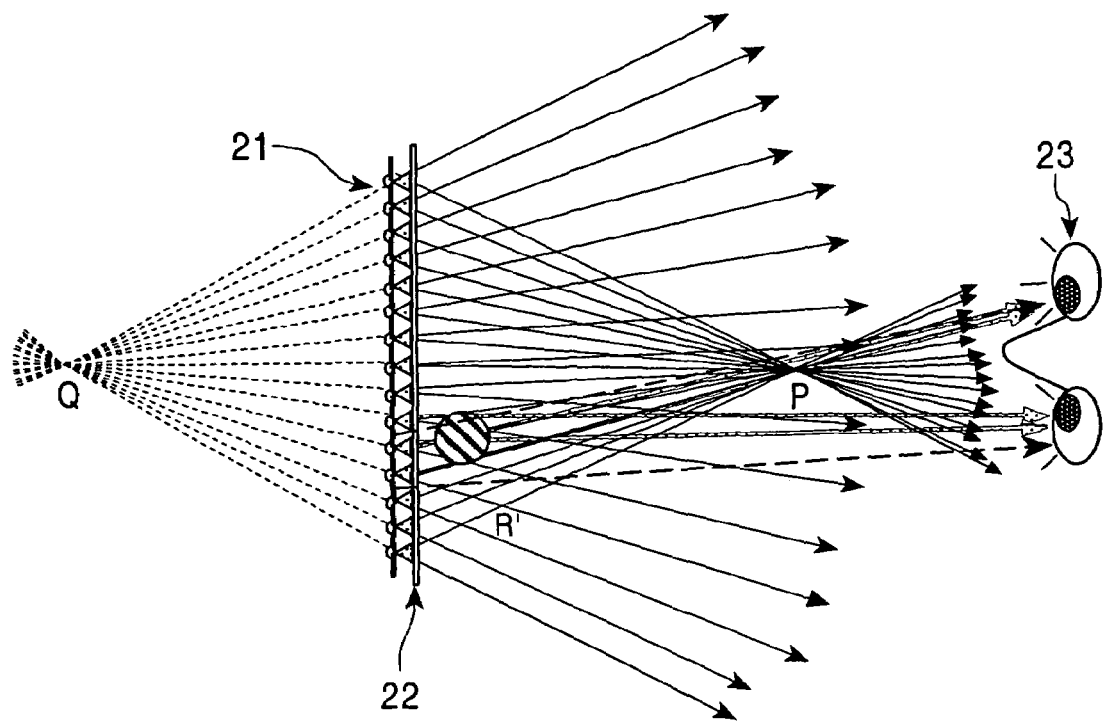
FIG. 8 designates a basic structure of a three-dimensional image display system utilizing both a light beam reproducing method and a shadowgraph type multi-view parallax method according to the invention.

FIG. 8 is a drawing showing a basic structure of the three-dimensional image display system utilizing both a light beam reproducing method and a shadowgraph type multi-view parallax method according to an embodiment of the invention.

In this figure, reference numeral 21 designates a white-color point light source array; 22 designates a color filter has a function as a light beam reproducing image filter for distant view and as a multi-view type parallax system image reproduction function for close view; and 23 is an observer.

The light beam emitted from the white-color point light source array 21 is appropriately weighed and colored by the color filter 22, and converted into a light beam for producing a light beam reproducing type 3D image at the position remote from the display unit. As regards image reproduction in the vicinity of the display unit (the white-color point light source array 21 and the color filter 22 are collectively referred to as display unit) that cannot allow light beams from a number of point light sources to pass, on the other hand, assuming that there exists a virtual object, the color filter 22 is adapted to color the virtual object at the exit (observer side) for a group of light beams passed through the virtual object out of a group of light beams emitted from the respective white-color point light sources. In the vicinity of the display unit, an object that is spread out to more than one pitch of the point light source is stereoscopically visualized as a multi-view parallactic image having a resolution in the order of one pitch of the array with the each point light source as a sample point of the image.

In FIG. 8, the light beam reproducing method is used for reproducing the point images P and Q, and the multi-view type parallax method is used for reproducing the small object R' in the vicinity of the display unit. As seen in FIG. 8, there is a parallax between light beams passing through the virtual object R' and coming into both eyes of the observer 23 (shown by thick lines). The two methods of coloring the portion remote from the display unit and the portion in the vicinity of the display unit by the color filter 22 are not completely different, but it changes transitionally according to the distance between the object to be reproduced and the display unit.

Figure 9:
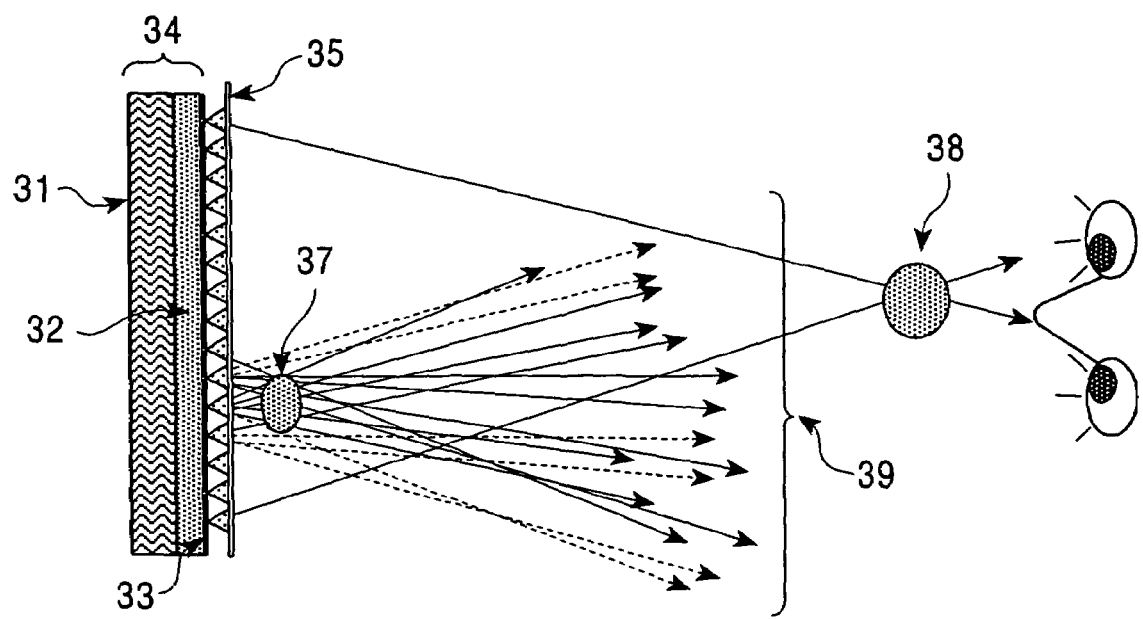
FIG. 9 is another example of the structure according to the invention.

FIG. 9 shows an example of the structure employing a combination of a white-color light source, a scatter plate and a pinhole array in place of the white-color point light source array according to the invention.

In this figure, reference numeral 31 designates a plate white-color light source; 32 designates a scatter plate; 33 designates a pinhole array; 34 designates a white-color point light source array; 35 designates a color filter having a function as a light beam reproducing image filter for distant view and as a multi-view parallax system image reproduction function for close view; 36 designates an observer; 37 designates an image reproduced by the multi-view parallax; 38 designates a stereoscopic image reproduced by the light beam reproducing method; and 39 designates a reproduced light beam.

Since the structure shown in FIG. 9 is similar to the simplified version of the pinhole type multi-view parallax system or integral photography using a pinhole array shown in FIG. 7 at first glance, the difference thereof is clarified here. In the structure shown in FIG. 9, the panel on which an image that is viewable from multiple points of view is located on the observer side of the pinhole array, which is opposite from the structure shown in FIG. 7. Therefore, in the structure shown in FIG. 7, image data from multiple points of view is required to pass through the pinhole without loosing its information, and thus the size of the pinholes can not be increased and also can not be decreased too much. In the structure shown in FIG. 9, on the other hand, the size of the pinhole can be reduced as far as white-color light of the backlight can pass through. In this manner, the former and the latter are completely different in structure and function.

Figure 10:
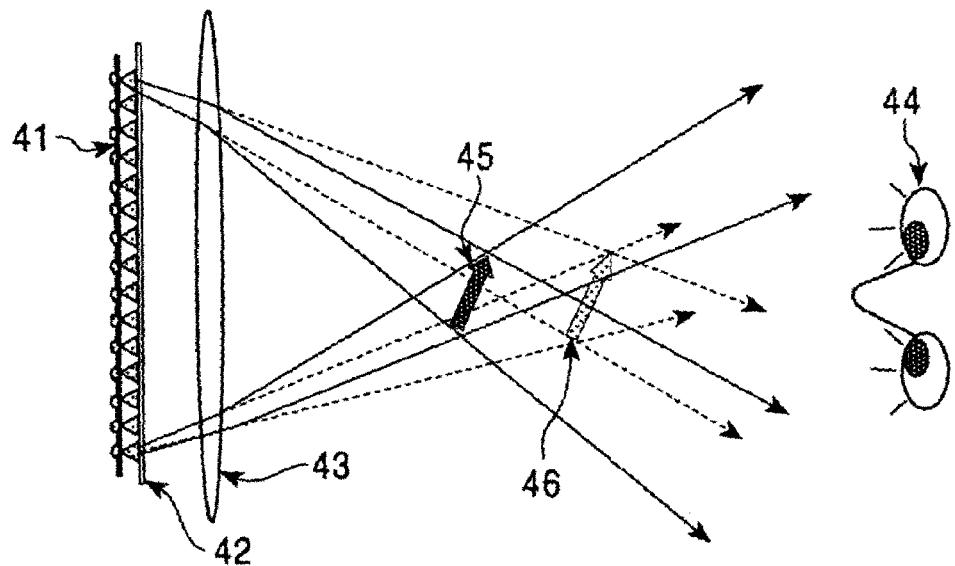
FIG. 10 is still another example of the structure (a type in which a lens is used) according to the invention.

FIG. 10 is an example of the structure in which a lens is inserted between the color filter and the observer. In this figure, reference numeral 41 designates a white-color point light source array; 42 designates a color filter or a liquid crystal panel; 43 designates a lens; 44 designates a observer; 45 designates a reproduced image when a lens is used; and 46 designates a reproduced image when no lens is used.

In such structure, diversities such as magnifying or reduction of the stereoscopic images, changing of the perspective position or observable visual angle of the observed image may be provided for reproduction of a stereoscopic image.

As regards image reproduction at the position remote from the display unit, the principle, effects and operations are the same as the light beam reproducing type three-dimensional image display system described in conjunction with the related art, and also as the "Stereoscopic image reproducing device with background", the description will be omitted.

Reproduction of an object in the vicinity of the display unit will now be described.

Figure 11:
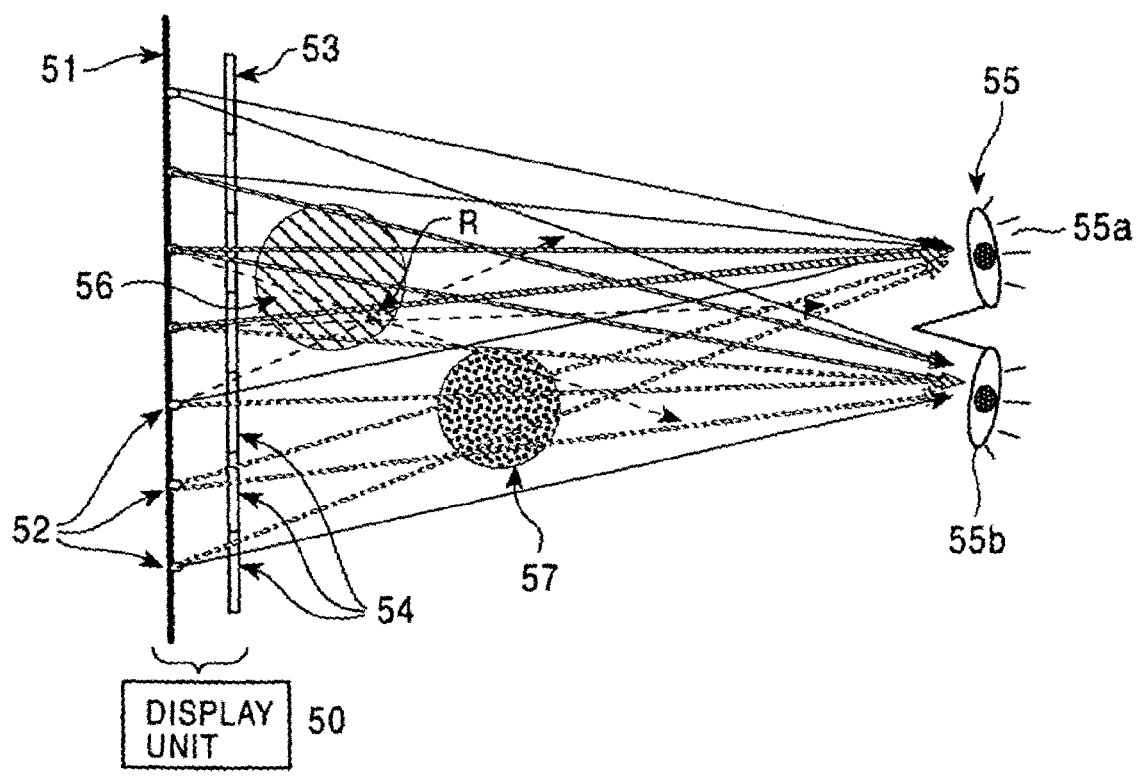
FIG. 11 is a conceptual drawing showing an operation of image reproduction in the vicinity of the display unit according to the invention.

FIG. 11 is a drawing showing a principle of the operation in the vicinity of the display unit according to the embodiment of the invention.

In this figure, reference numeral 50 designates a display unit; 51 designates a white-color point light source array; 52 designates each white-color point light source; 53 designates a color filter; 54 designates each section of the filter; 55 designates an observer; 56 and 57 are objects to be reproduced. In this case, reproduction of the hatched object 56 and the dotted object 57 is contemplated. Since only about three light beams passing through an arbitrary point R on the hatched object 56 can be reproduced and most of them cannot reach both eyes of the observer, a three-dimensional image cannot be reproduced or it cannot even be viewed in many cases. On the other hand, it is possible to produce infinite number of light beams that are emitted from the white-color point light sources 52, though there are only small number of them, and pass through these two objects 56 and 57, and to allow some of them to reach both eyes of the observer (since the distance between the white-color point light source array and the color filter section is normally about several millimeters, it is assumed that the objects are in the order of several millimeters in size). Since the light beams thus reached include parallax data in addition to image data of the objects, though the spatial resolution is limited by the intervals between the white-color point light sources, the objects can be recognized with the equivalent stereoscopic effect as the multi-view parallax system that will be described later, though the stereoscopic effect as much as the light beam reproducing method cannot be obtained.

In FIG. 11, since the two objects 56 and 57 are positioned apart from each other when viewed by the right eye 55a, but are overlapped when viewed by the left eye 55b, and the directions of the light beams from the respective objects 56, 57 are different, it is understood that the parallax exists.

Figure 12:
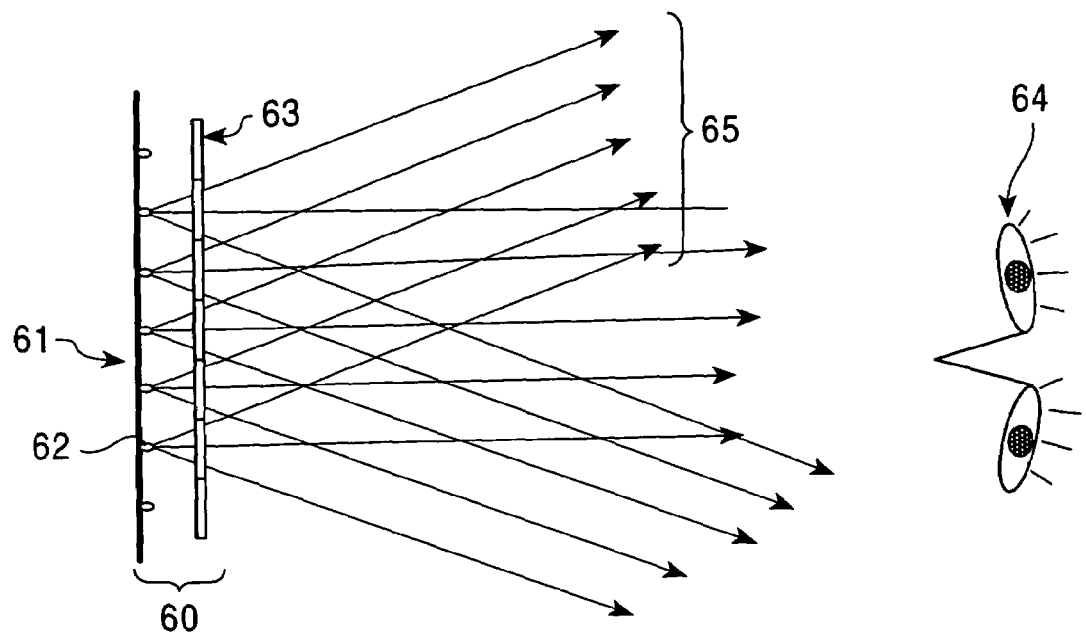
FIG. 12 is a drawing showing reproduction of parallax stereoscopic image in the vicinity of display unit according to the invention.

FIG. 12 is a drawing showing reproduction of parallax stereoscopic image in the vicinity of the display unit according to the invention.

In this figure, reference numeral 60 designates a display unit; 61 designates a white-color point light source array; 62 designates a white-color point light source; 63 designates a color filter; 64 designates a observer; and 65 designates a group of light beams. The position where the group of light beams 65 in this direction intersect with the color filter 63 includes image data viewed from this visual angle written thereon. Light beams in many other directions are the same.

The multi-view parallax system here significantly differs from the one described in conjunction with FIG. 7. In other words, the different point is that the color filter 63 on which drawings corresponding to the respective angles of view are written is located at the position nearest to the observer 64, and is illuminated by the white-color point light source 62 from behind thereof so that the observer is viewing shadowgraph.

On the other hand, in the structure shown in FIG. 7, the observer views the drawing through the slit or the pinholes, which is located behind thereof. Alternatively, in the integral photography, image of a slide projector or of a pinhole photograph through the pinhole is viewed via the lens from the opposite side in the air. The difference is understood from the fact that the positional relation of the image seen on the near side is the same as that of the written image in the case of FIG. 12, but it is inverted vertically and laterally in the case of the structure shown in FIG. 7.

Figure 13:
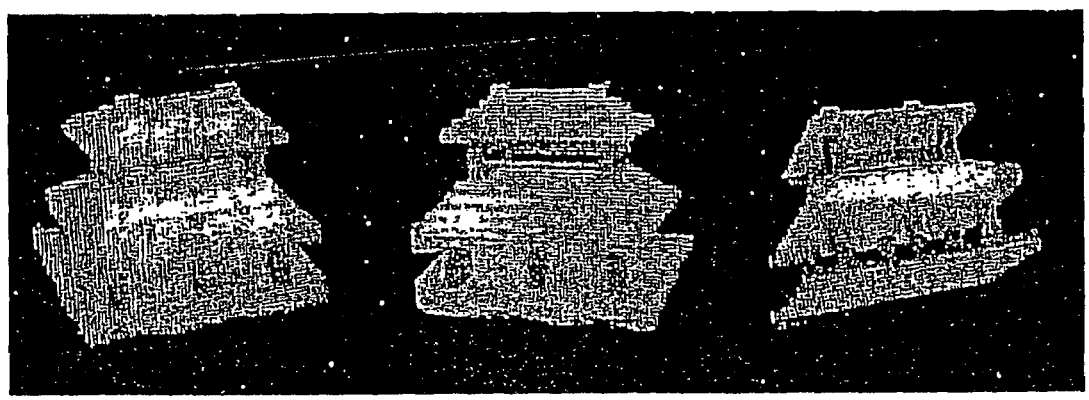
FIG. 13 is a drawing showing an example of the three-dimensional image reproduced according to the invention.

FIG. 13 shows an example of a photograph of a three-dimensional image reproduced according to the invention taken by a camera from various angles. The front portion and the rear portion of the building are images produced by light beam reproducing method and the depthwise central portion of the building is the position of the light source array and the portion in the vicinity thereof is reproduced by parallactic reproducing method. When a frost glass plate or the like was placed at the portion of the 3D image reproduced by the light beam reproducing method, it was focused at the sectional portion of the image. It means that the image is formed at the position where the image is viewed as if it is formed by the lens.

Figure 14:
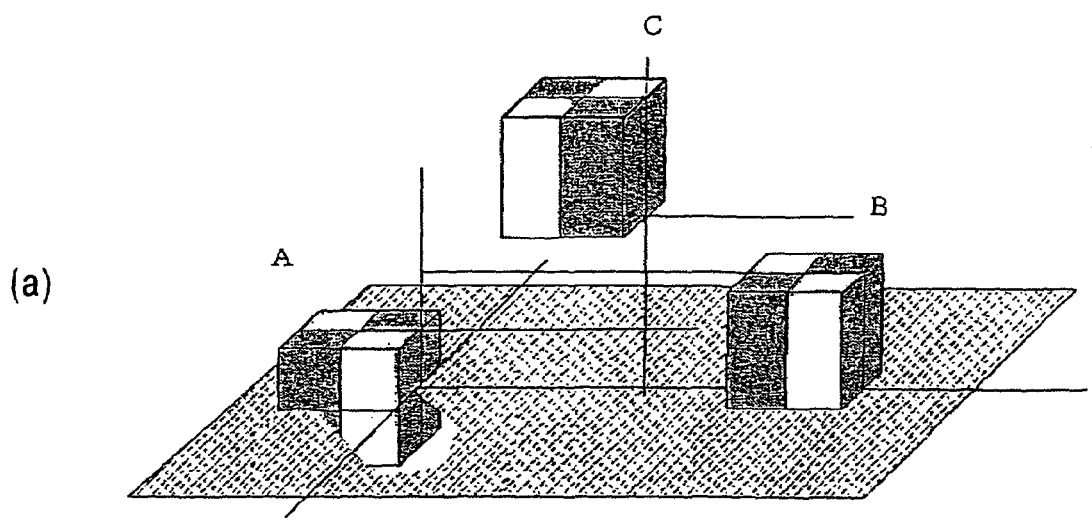
FIG. 14 is a drawing showing a color filter according to an embodiment of the invention.
Figure 14:
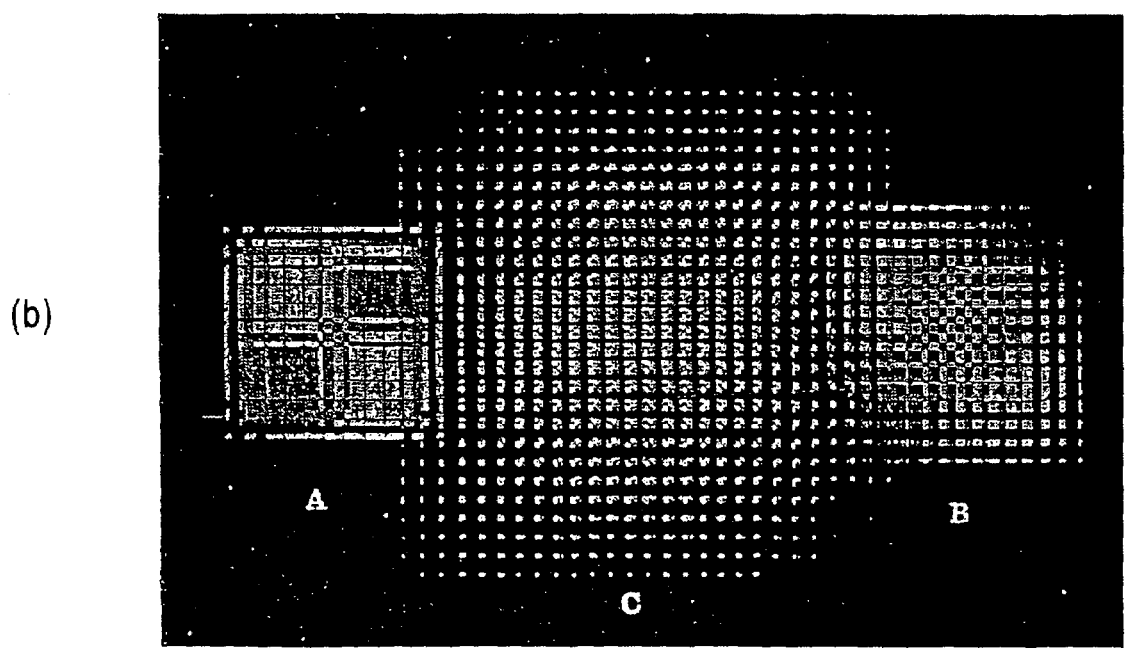

FIG. 14 is a drawing showing a color filter according to the embodiment of the present invention.

Three cubic objects (2×2×2) A, B and C having patterns thereon are placed as three-dimensional objects to be reproduced as shown in FIG. 14(a), and are positioned so that the upper surfaces thereof are apart from the point light source by 1, 2, and 5 respectively.

The color filter for reproducing these objects may be the one shown in FIG. 14(b). The dimensions of one section of the color filter are 0.25×0.25. The figure of the cubic object A that is located at the position nearest to the display unit remains on the color filter as a large pattern extending over several sections. It is understood that the filter is colored so that the position where the color changes is observed in the different ways depending on the viewing position. The figure of the cubic object B that is located at the position little further from the display unit also remains thereon as a large pattern as in the case of the cubic object A, but patterns of the object B also appeared for each color section. As regards the figure of the cubic object C that is located at the position sufficiently away therefrom, the entire cubic object C viewed from various angles of view being different from section to section is drawn thereon, but a large pattern extending over several sections cannot be seen.

Therefore, it is understood that the color filter is colored by the multi-view parallax system as for the cubic object A, and is colored by the light beam reproducing method as for the cubic object C. As regards the cubic object B, coloring of the color filter is performed by the mechanism between these methods.

Second embodiment of the invention will now be described.

Figure 15:
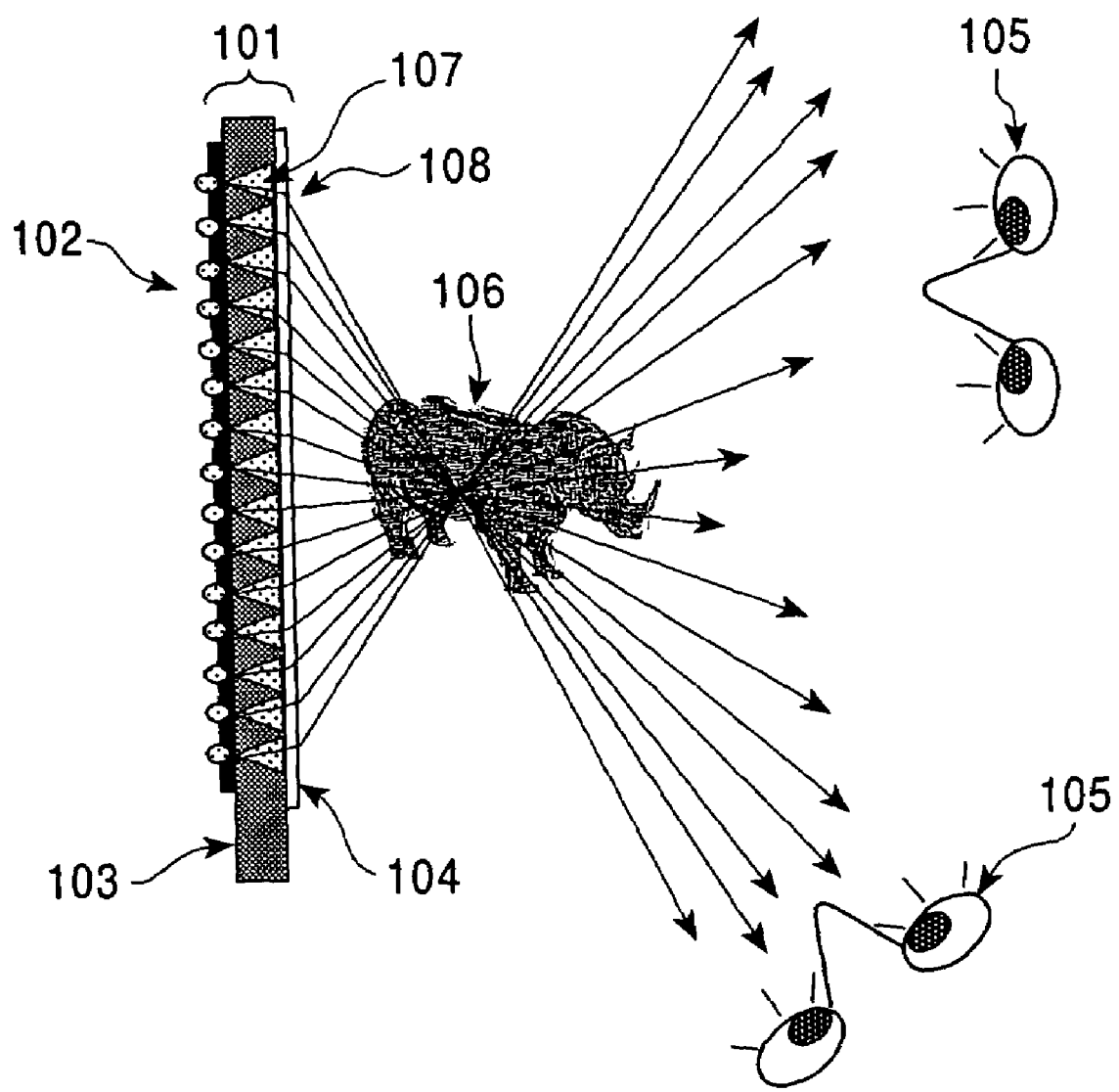
FIG. 15 is a drawing showing a basic structure of a wide visual angle three-dimensional image display system in which crosstalk images are prevented from being generated.

FIG. 15 is a drawing showing a basic structure of the wide visual angle three-dimensional image display system in which crosstalk images are prevented from being generated according to the invention.

In this figure, reference numeral 101 designates a display unit; 102 designates a white-color point light source array; 103 designates a transparent medium having a refractive index of more than one; 104 designates a color filter (that may be a liquid crystal); 105 designates a observer; 106 designates a reproduced 3D image; 107 designates a white-color light emitted from the white-color point light source array 102; and 108 designates refraction of the light beam 107.

As shown in FIG. 15, the portion of the light beams 107 emitted from the white-color point light source array 102 is adequately weighed and colored by the color filter 104 and converted into a light beam forming 3D images.

Reproduction of the image in the vicinity of the display unit 101, the function of the color filter differs depending on the method such as the "light beam reproducing type three-dimensional image display device", the "stereoscopic image reproducing device with background" or the "three-dimensional image display system utilizing both a light beam reproducing method and a shadowgraph type multi-view parallax method" according to the invention. However, the light beam reproducing method is used basically in all the devices. The transparent medium (transparent plate) 103 having a refractive index of more than one is inserted between the white-color point light source array 102 and the color filter 104. The light beam generated by the white-color light source and the color filter 104 refracts upon passing through the color filter 104 (to be correct, when leaving the transparent medium 103), and comes out at a laying angle, or at a wide angle when ignoring the change of light path in the color filter 104 since it is very thin. Therefore, the spatial pattern of the filter of the color filter 104 is drawn with the effect of refraction taken into account. By widening the incoming angle of the light beam, the region in which the 3D images can be observed is widened.

Figure 16:
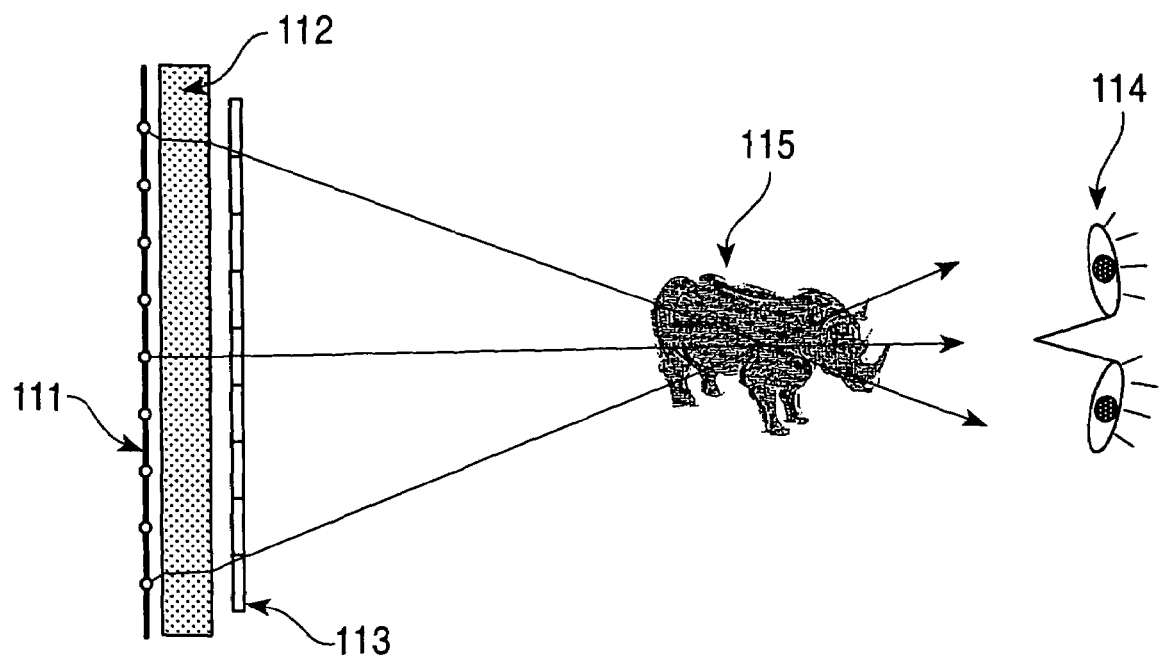
FIG. 16 is a drawing showing a second structure of the invention.

FIG. 16 is a drawing showing an example of the structure in which the transparent body of the wide visual angle three-dimensional image display system in which crosstalk images are prevented from being generated is not filled entirely of the gap between the white-color light source array and the color filter, but filled only partly thereof. In this figure, reference numeral 111 designates a white-color point light source array; 112 designates a transparent medium having a refractive index of more than one; 113 designates a color filter; 114 designates an observer; 115 designates a reproduced three-dimensional image.

Figure 17:
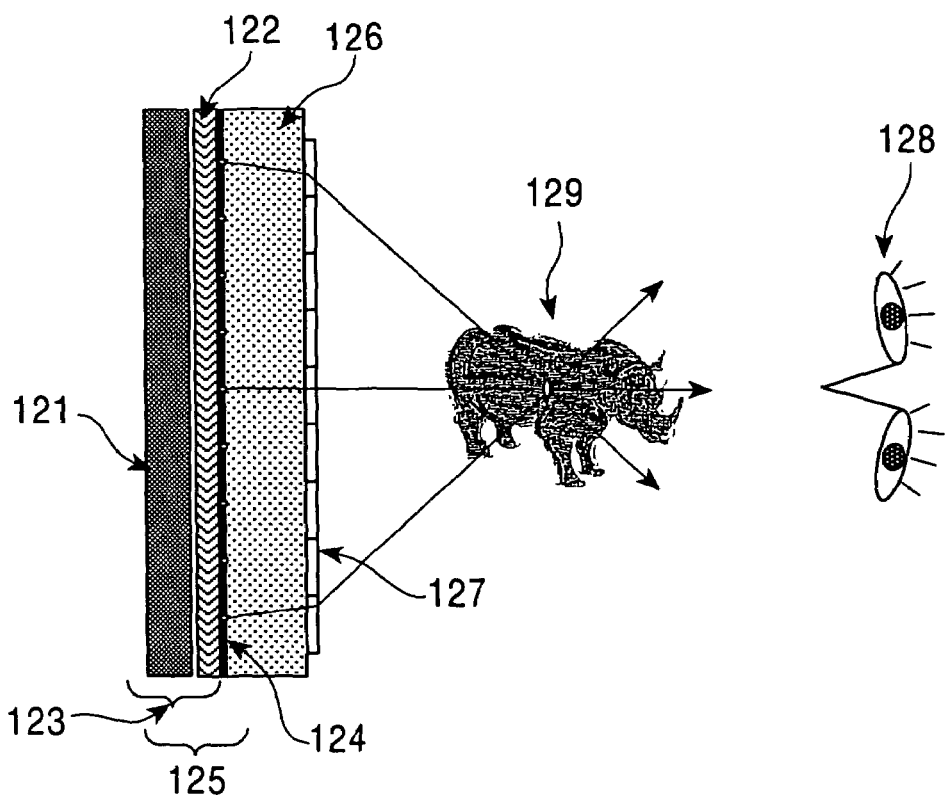
FIG. 17 is a drawing showing a third structure of the invention.

FIG. 17 is a drawing showing an example of the structure in which the white-color point light source array of the wide visual angle three-dimensional image display system in which generation of crosstalk images is prevented is substituted by a combination of a white-color light source, a scatter plate and a pinhole array. In this figure, reference numeral 121 designates a white-color light source; 122 designates a scatter body; 123 designates a backlight including a white-color light source and a scattered body; 124 designates a pinhole array; 125 designates a portion corresponding to the white-color point light source array; 126 designates a transparent medium having a refractive index of more then one; 127 designates a color filter; 128 designates an observer; and 129 designates a reproduced 3D image.

Figure 18:
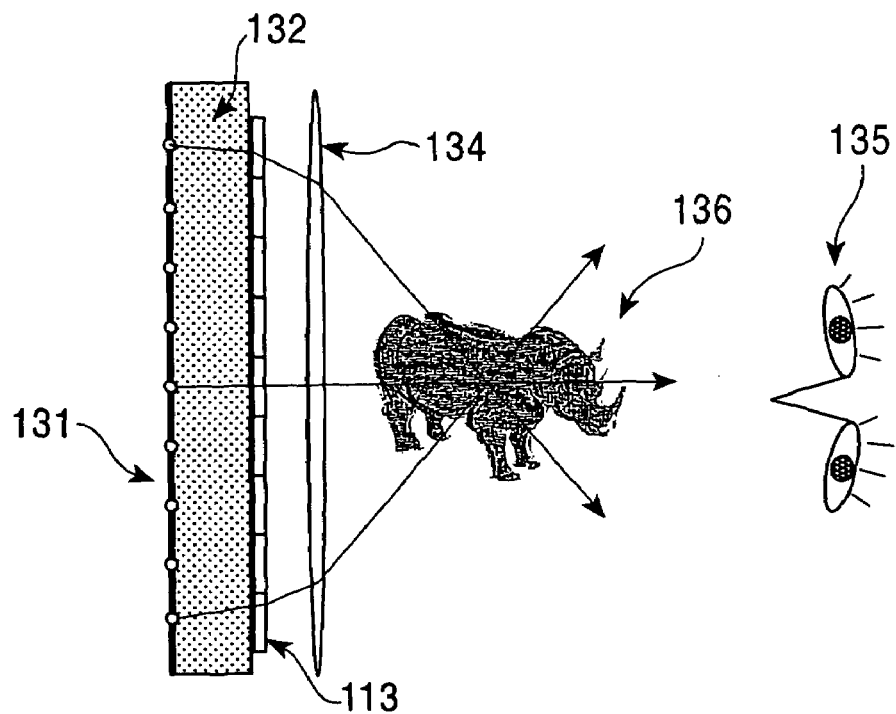
FIG. 18 is a drawing showing a fourth structure of the invention.

FIG. 18 is an example of the structure in which a lens is used. In this figure, reference numeral 131 designates a white-color point light source array; 132 designates a transparent medium having a refractive index of more than one; 133 designates a color filter; 134 designates a lens; 135 designates a observer; and 136 designates a reproduced 3D image.

In such structure, the depth, the size, and/or the angle of divergence of the reproduced three-dimensional image 136 may be adjusted and thus diversities may be provided for reproduction of the stereoscopic images.

Figure 19:
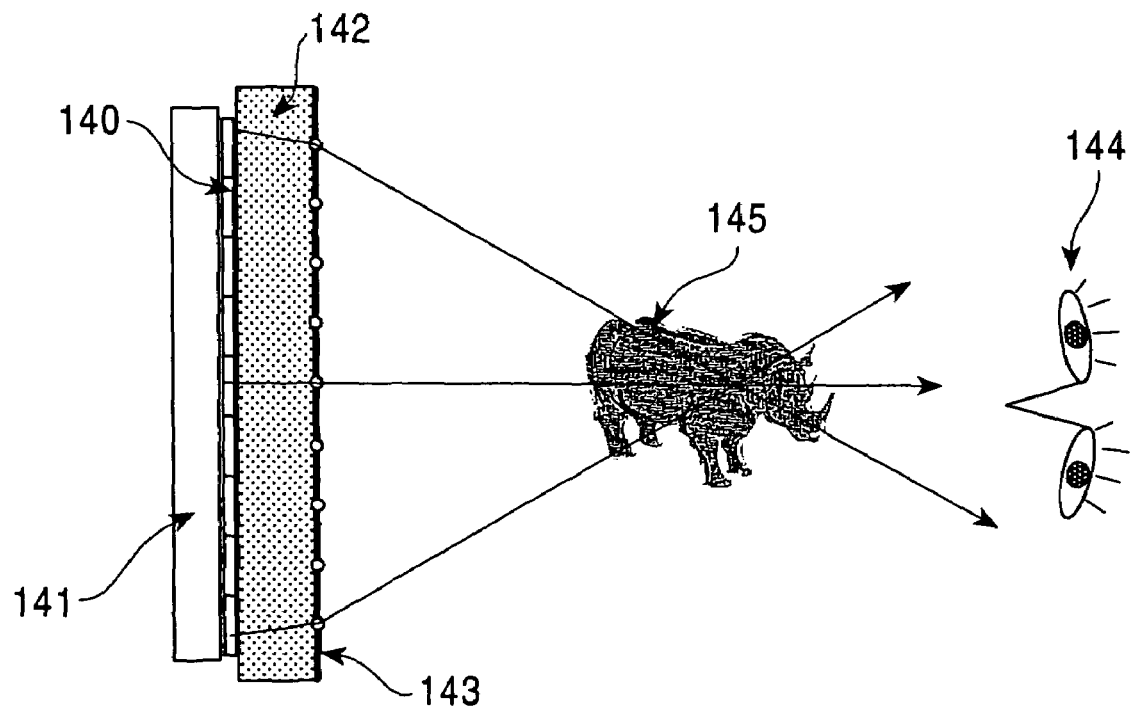
FIG. 19 is a drawing showing a structure in which the invention is applied to the conventional multi-view type parallax.

FIG. 19 is a drawing showing an example of the structure in which the present invention is applied to the conventional multi-view parallax system. In this figure, reference numeral 140 designates a multiple-visual angle image display unit; 141 designates a backlight; 142 designates a transparent medium having a refractive index of more than one; 143 designates a micro lens array, a pinhole array, or a slit array; 144 designates an observer; and 145 designates a reproduced 3D image.

(Detailed Operations of the Embodiments and Specific Effects Based on the Embodiments)

Figure 20:
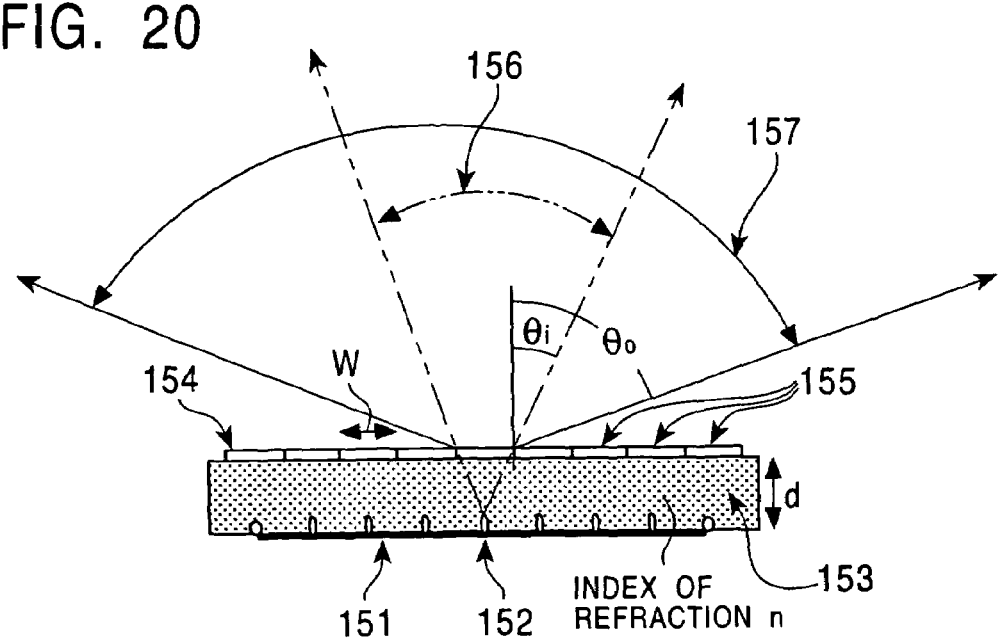
FIG. 20 is an explanatory drawing showing broadening of generated light beam by inserting a transparent medium with a refractive index of more than one according to the invention.

Referring to FIG. 20, the case in which the gap is filled with a transparent medium (plate) having a refractive index of n(>1) will be described as an example. In FIG. 20, reference numeral 151 designates a white-color point light source array; 152 designates a white-color point light source; 153 designates a transparent medium (refractive index n; thickness d); 154 designates a color filter; 155 designates each color filter section; 156 designates a range of light beams that do not intervene adjacent color filter section 155 (without transparent medium of n>1); and 157 designates a range of light beams that do not intervene adjacent sections of the color filter (with transparent medium of n>1).

Reference sign W represents the pitch of the white-color point light source 152 and reference sign d represents the distance between the color filter 154 and the white-color point light source array 151. A light beam emitted from a certain white-color point light source 152 and proceeds toward the borders between the corresponding color filter section 155 and the adjacent color filter sections 155 is taken as an example. When the light beam passes through the adjacent sections, it forms a crosstalk image. Therefore, the light beam is inclined to the limits that exclude formation of crosstalk images. According to the figure, the angel $\theta_i$ of this light beam is;

$$\theta_i = \text{Tan}^{-1}(W/2d) \tag{1}$$

Assumed that this light beam is emitted into the air and refracted at an angle of $\theta_o$, from Snell laws of refraction.

$$\sin \theta_o = n \sin \theta_i \tag{2}$$

Since n is greater than 1, $\theta_o$ is greater than $\theta_i$, and the light beam is inclined more toward the flat position by the transparent medium 153 being inserted. This means that a light beam is generated more widely without allowing it to pass through the adjacent color filter. Furthermore, when setting to $$\theta_i [= \text{Tan}^{-1}(W/2d)] \geq \text{Sin}^{-1}(1/n) \tag{3},$$

the light beam invaded into the adjacent color filter section is totally reflected and thus they cannot go outside to completely prevent crosstalk image from being generated. In this case, a wide angle of light beam to about $\theta_o \approx 90°$ may be generated without passing through the adjacent color filters.

Figure 21:
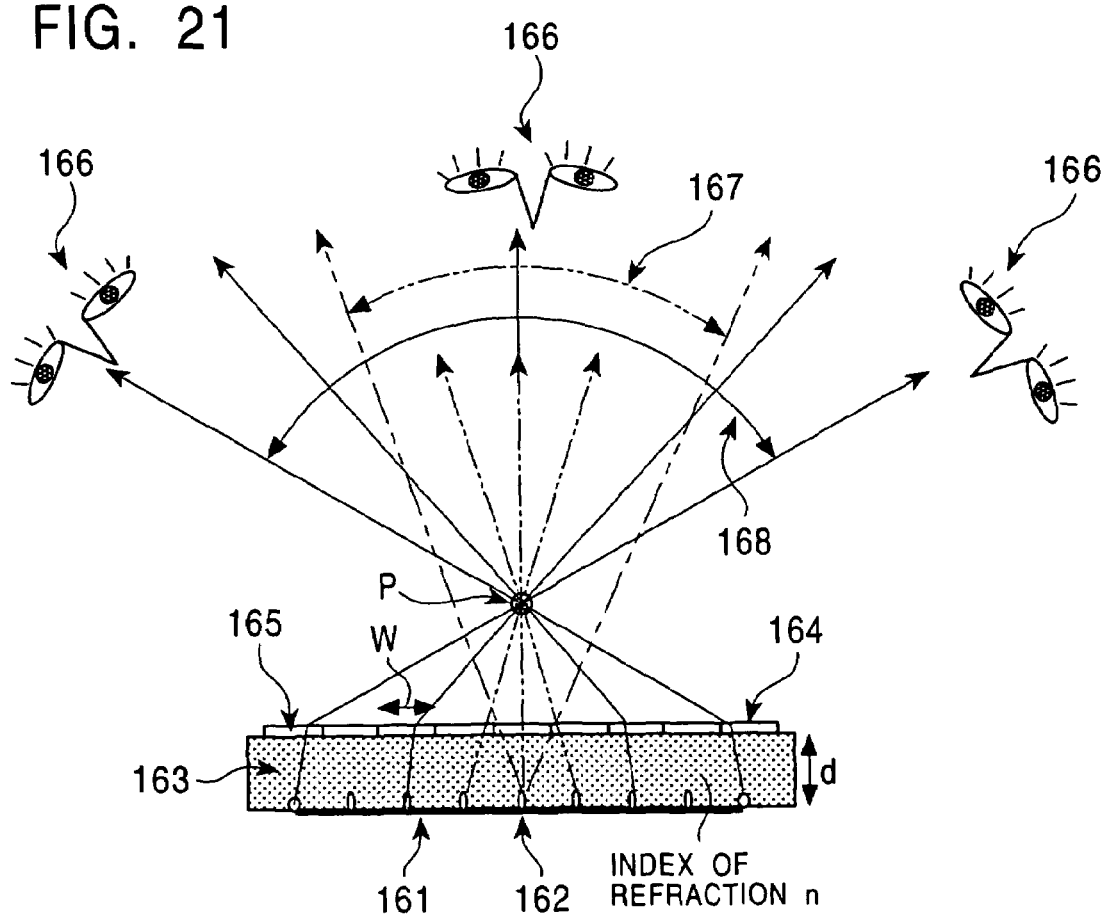
FIG. 21 is an explanatory drawing showing broadening of observable region according to the invention.

FIG. 21 is an explanatory drawing showing that the stereoscopic image may be observed within a wide range, in other word, that the visual angle may be broadened, if reproduction of wide angled light beam is enabled. In this figure, reference numeral 161 designates a white-color point light source array; 162 designates a white-color point light source; 163 designates a transparent medium (refractive index n, thickness d); 164 designates a color filter; 165 designates each section of the color filter; 166 designates an observer; 167 designates a range that enables stereoscopic vision when the refractive index of the transparent medium is 1 or when the gap is filled with air; 168 designates a wider range that enables stereoscopic vision when the refractive index of the transparent medium is larger than one; and P designates a reproduced point image.

The reproduced image here is a point image P for the sake of simplification. When the transparent medium 163 having a refractive index of more than one is not inserted, the region in which the P is stereoscopically viewed is only the inside of two chain double-dashed lines, or the region 167 for stereoscopic vision. On the other hand, when the transparent medium having a refractive index of more than one is inserted, the P can be viewed stereoscopically also from the direction near the side as shown in the figure. It is expected that the region of stereoscopic vision will be increased if the color filter 164 or the like is larger than that shown in FIG. 21, and the stereoscopic view may be enabled even from the almost horizontal direction.

Figure 22:
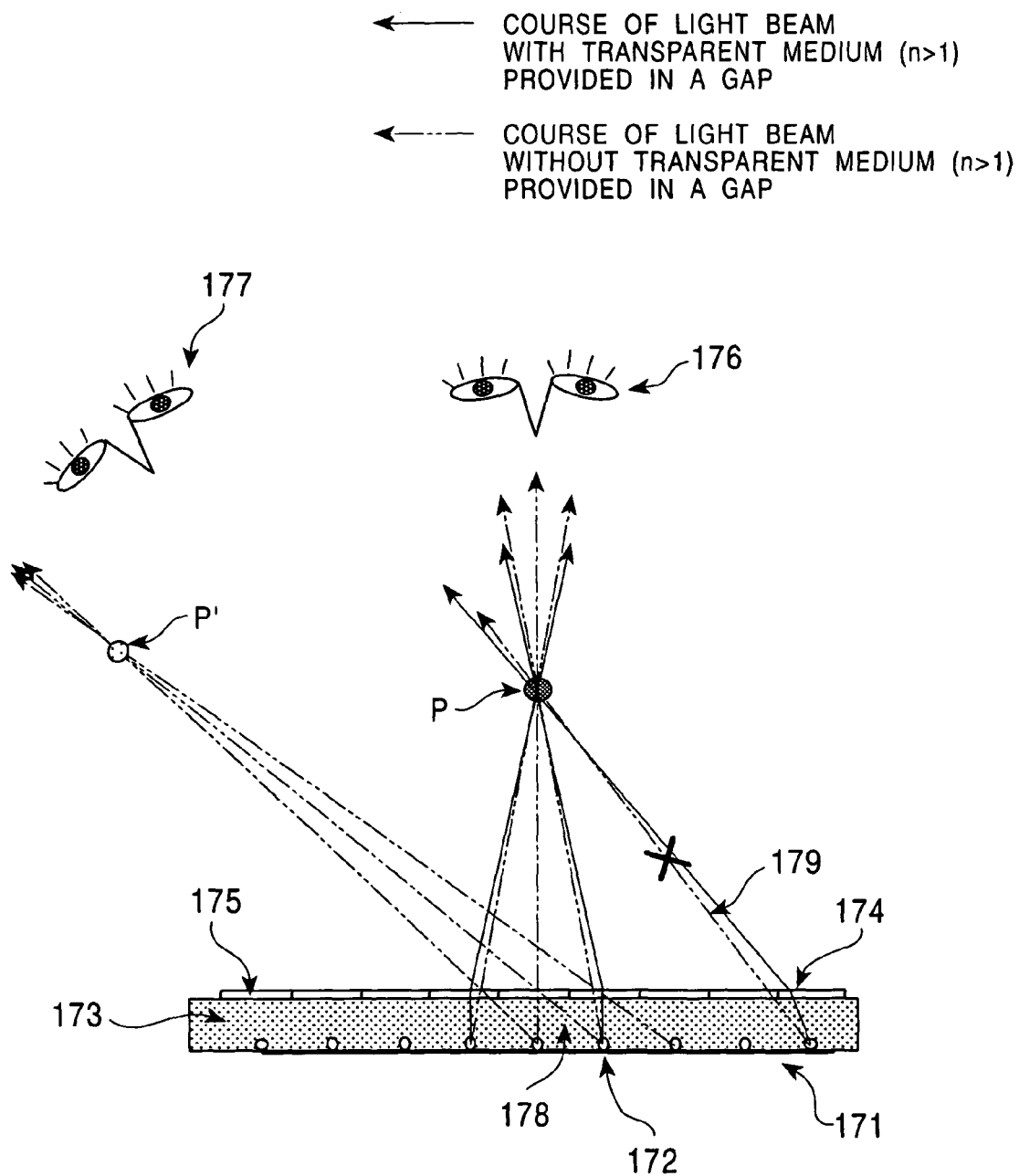
FIG. 22 is an explanatory drawing showing prevention of crosstalk images from being generated by total reflection according to the invention.

The mechanism of prevention of crosstalk image will be described referring to FIG. 22. In FIG. 22, reference numeral 171 designates a white-color point light source array; 172 designates a white-color point light source; 173 designates a transparent medium; 174 designates a color filter; 175 designates each section of the color filter; 176 designates an observer A; 177 designates an observer B; and P designates reproduced point images; P' designates a crosstalk image when the transparent medium is n=1 (or when the transparent medium is not provided); solid line represents light beam when the transparent medium (n>1) is provided, and chain double dashed line represents light beam when the transparent medium (n>1) is not provided. The light beam 178 is totally reflected by the boundary surface to prevent it from outgoing, so no crosstalk image is generated (generation of the light beam 179 is not desirable).

In this case, it is assumed that the point image P is reproduced. When the transparent medium of n>1 is not provided, the light beams for reproduction (chain double-dash line) proceed almost only in the front direction. The crosstalk image P' is generated by the light beams that invaded into the adjacent color filter sections from the corresponding white-color point light source and that passed through the portion for reproducing the point P. In addition, the light beam from the rightmost light source cannot be used in the normal usage since such light beam passes through the adjacent color filter section when it is used for forming the point P. In other words, the position where a normal stereoscopic image can be observed without crosstalk image is only the position in the vicinity of the front direction (near the position of the observer A in the figure), and when the image is observed from the position offset sideways from the front (the position of the observer B in the figure), the correct reproduced image cannot be observed and a crosstalk image is observed.

On the other hand, when the transparent medium of n>1 is inserted, a wide visual angle is secured since the point p is reproduced by the light beams (solid lines) formed normally from all the white-color light sources according to this figure. As in the case of the light beam 178 or the light beam 179, since the light beam invaded into the adjacent color filter section is totally reflected when the above-described expression (3) is satisfied, and thus it never goes out as a light beam, no crosstalk image is reproduced. Even when the above-described expression (3) is not satisfied, the region where the crosstalk image appears is limited to the case when it is viewed almost from the side that is about 90° from the front, and thus there arises no problem practically.

The invention may be applied to the fields of image technology, broadcasting technology, the arts, the multimedia industry, advertisement, and photographs.

As products, three-dimensional displays, stereoscopic signboard, and stereoscopic theater system and the like, and specifically, it may be utilized in the advertisement media or displays for school children are included.

The invention is not limited to the above-described embodiment, and may be modified in various ways based on the drift of the invention and these modifications are not excluded from the scope of the invention.

As described above, according to the invention;

[A] reproduction of natural three-dimensional images is realized at the rear and front of the display unit, a stereoscopic vision due to parallax of vertical and lateral multiple visual points is realized in the vicinity of the display unit, and both of them are mixed in the intermediate region, so that a three-dimensional stereoscopic image may be observed in the entire region, or continuously from behind of the display unit.

[B] three-dimensional image is observable in a wide vision angle, and crosstalk image can be completely prevented from being produced.

More specifically, by inserting a transparent medium having a refractive index of more than one between the white-color point light source array and the color filter, light beams incoming from the adjacent point light source into the section of the color filter, which serves to selectively color light beams from the point light source for displaying three-dimensional images, and causing harmful crosstalk images, are totally reflected to prevent it from outgoing. In addition, the light beams in use may be increased for reproducing images using parallax in the vicinity of the filter by utilizing such nature that a light beam spreads out more outside such transparent medium due to refraction thereof. A light beam reproducing three-dimensional reproducing device having a wide visual angle and completely preventing crosstalk images from being generated may be obtained.

By inserting glass or plastic plate as a transparent medium with a thickness of 0.5 mm to 5 mm between the light source array and the filter, the visual angle near 180° is achieved.

INDUSTRIAL APPLICABILITY

The three-dimensional image display system of the invention may be used in the fields of image technology, broadcasting technology, the arts, the multimedia industry, advertisement, and photographs, and as products, three-dimensional displays, stereoscopic signboard, and stereoscopic theater system and the like are included, and especially, it is desirable for advertisement media and displays for school children.

What is claimed is:

1. A three-dimensional image display system utilizing both a light beam reproducing method and a shadowgraph multi-view parallax method, comprising:
   a color filter disposed on an observer side of a white-color point light source array,
   wherein light beams from the white-color point light source are selectively colored by the color filter so that a plurality of light beams corresponding to scattered light from each point of an object is generated so that an image of each point is formed in a region remote from the color filter and the white-color point light source,
   light beams are selectively colored by the color filter for a portion in a vicinity of the white-color point light source and the color filter where a sufficient number of light beams cannot be reproduced so that image data reaching the observer from the white-color point light source through the color filter forms a view-dependent parallax stereoscopic display operation not only laterally but also vertically, and
   these two operations are mixed in an intermediate region so that a stereoscopic image is continuously formed.

2. A three-dimensional image display system according to claim 1, wherein one or more lenses are disposed between the color filter and the observer to provide flexibility in visual appearance and/or filter design.

3. A three-dimensional image display system according to claim 1 or 2, wherein a lens is inserted between the white-color point light source array and the color filter to provide flexibility in visual appearance and/or filter design.

4. A three-dimensional image display system according to claim 1 or 2, wherein the white-color point light source array includes a combination of a white-color light source, a scatter plate and a pinhole array.

5. A three-dimensional image display system according to claim 1 or 2, wherein the color filter is a space modulating panel configured to dynamically control reproduced three-dimensional images.

6. A three-dimensional image display system having a wide visual angle, comprising:
   a transparent medium with a refractive index of more than one inserted entirely or partially between a white-color point light source array and a color filter to broaden the three-dimensional image observable region by utilizing such nature that a light beam spreads out more outside such transparent medium due to refraction thereof,
   wherein light beams are incident at laying angles from the adjacent white-color point light source into a section of the color filter, which serves to selectively color light beams from the white-color point light source for displaying three-dimensional images, and harmful crosstalk images are totally reflected and prevented from exiting the medium, so that three-dimensional images may be observed from a wide visual angle while completely preventing a crosstalk image from being generated.

7. A three-dimensional image display system according to claim 6, wherein a lens or lenses are inserted between the color filter and an observer, and/or between the white-color point light source array and the color filter to provide flexibility in visual appearance and/or filter design.

8. A three-dimensional image display system according to claim 6 or 7, wherein the white-color point light source array is substituted by a combination of a white-color light source, a scatter plate, and a pinhole array.

9. A three-dimensional image display system according to claim 6 or 7, wherein the color filter is a space modulating panel capable of dynamic control of a liquid crystal panel configured to animate reproduced three-dimensional images.

10. A three-dimensional image display system comprising:

a transparent medium with a refractive index of more than one disposed between an image panel or a color filter and a parallax barrier, a slit, a pinhole array or a micro lens array, wherein a three-dimensional image observable region is broadened by utilizing such nature that a light beam spreads out more outside the transparent medium due to refraction thereof so that a wide visual angle is achieved, and crosstalk images that appear when observing from the side are prevented from being generated by utilizing total reflection.

\* \* \* \* \*